United States Patent
Mueller et al.

(10) Patent No.: US 8,332,298 B2
(45) Date of Patent: Dec. 11, 2012

(54) SYSTEM AND METHOD FOR EXPOSURE MANAGEMENT

(75) Inventors: Klaus Mueller, Neustadt a.d. Weinstrasse (DE); Reinhold Loevenich, Sandhausen (DE); Vinodh A R, Bangalore (IN); Pankaj Jain, Delhi (IN)

(73) Assignee: SAP AG, Walldorf (DE)

( * ) Notice: Subject to any disclaimer, the term of this patent is extended or adjusted under 35 U.S.C. 154(b) by 627 days.

(21) Appl. No.: 12/199,775

(22) Filed: Aug. 27, 2008

(65) Prior Publication Data

US 2009/0313175 A1 Dec. 17, 2009

Related U.S. Application Data

(60) Provisional application No. 61/073,027, filed on Jun. 16, 2008.

(51) Int. Cl.
*G06Q 40/00* (2012.01)
(52) U.S. Cl. .................................................. 705/36 R
(58) Field of Classification Search .................. 705/1.1, 705/4, 35, 36 R, 37
See application file for complete search history.

(56) References Cited

U.S. PATENT DOCUMENTS 7,778,897 B1 * 8/2010 Rachev et al. ................. 705/35
2007/0094118 A1 * 4/2007 Becker et al. ............... 705/36 R

OTHER PUBLICATIONS

Template-Based Mapping of Application Data to Interactive Displays, P. Szekely, ACM 1990.*
A Comparison of Group-based and Object-based Data Clustering Techniques, A. Bouguettaya, Q. Le Viet, M. Golea, 8th International Database Workshop: Data Mining, Data Warehousing, and Client-Server Databases, Hong Kong, Jul. 1997.*

* cited by examiner

*Primary Examiner* — Olabode Akintola
(74) *Attorney, Agent, or Firm* — Kenyon & Kenyon LLP

(57) ABSTRACT

A system, method, and computer-readable medium having instructions stored thereon to implement a method for risk exposure management allowing an exposure record to influence one or more risk exposures. In an embodiment, an exposure record is received, at least one data element of the received exposure record being mapped to one or more subexposures. At least one of the one or more subexposures are mapped to one of one or more exposure positions, wherein each exposure position corresponds to exactly one of the one or more risk exposures.

17 Claims, 5 Drawing Sheets

SYSTEM AND METHOD FOR EXPOSURE MANAGEMENT

CROSS-REFERENCE TO RELATED APPLICATIONS

This application claims priority to U.S. Provisional Patent Application No. 61/073,027, filed Jun. 16, 2008, entitled "Method and System for Exposure Management," which is herein incorporated by reference in its entirety.

COPYRIGHT AND LEGAL NOTICES

A portion of the disclosure of this patent document may contain material which is subject to copyright protection. The copyright owner has no objection to the facsimile reproduction by anyone of the patent document or the patent disclosure as it appears in the Patent and Trademark Office patent files or records, but otherwise reserves all copyrights whatsoever.

BACKGROUND

Business entities, e.g., banks, enter into a large number of transactions in the ordinary course of their operations. Some of these transactions carry financial risks such as currency or foreign exchange (FX) risks, commodity price risks, interest rate risks, stock price risks, and counterparty risks, to name a few. For example, individual loans carry the risk of debtor default, currency exchange rate fluctuations, or changing interest rates for variable rate loans or imminently mature loans (whose principal likely will be reinvested at a new interest rate). Typically, the business entities' internal policies or banking regulations of governing regulatory bodies, e.g., the International Accounting Standards Board (IASB), which has promulgated the International Accounting Standard (IAS) 39, *Financial Instruments: Recognition and Measurement*, or the Financial Accounting Standards Board (FASB), which has promulgated the Financial Accounting Statement (FAS) 133, *Accounting for Derivative Instruments and Hedging Activities*, require, at least in some instances, that the business entities own instruments, typically derivatives such as options, whose behavior counterbalances risks presented by the transactions. This is called "hedging."

Risk exposures presented by a first, typically numerically large, set of instruments are counterbalanced by performance of a second, typically much smaller, set of instruments (called "hedging instruments" herein), such that when risk rises with respect to the instruments that present the risk exposures, risk falls in the hedging instruments. For example, a set of instruments are grouped and treated as a single exposure that is to be hedged. One or more hedging instruments counterbalance the exposure group. The exposures or exposure groups and their corresponding hedging instruments are grouped into corresponding hedging relationships. A hedging relationship associates one or more particular hedging instruments with a particular exposure or exposure group. Accordingly, use of hedging relationships aids in management of risk exposures and corresponding hedging instruments and facilitates compliance with hedging policies or regulations.

Hedging policies or regulations often require that certain exposures be hedged separately, for example, by different hedging instruments, and/or require or allow for grouping of certain exposures into a single group to be hedged by a common hedging instrument or common group of hedging instruments. For example, a business entity often includes numerous departments and/or is often a parent company that has multiple subsidiaries. It is often the case that each or some of the departments and/or subsidiaries individually enter into transactions that create an exposure to risk that is required to be offset by hedging instruments. In some instances, it is left to a central treasury department of the business entity and/or to the parent company to acquire hedging instruments to offset the risk created by transactions of the individual departments and or subsidiaries. Hedging policies or regulations may require that the central treasury department and/or parent company separately hedge against risk of exposures of the individual or certain of the individual departments or subsidiaries.

As another example, an automobile manufacture may wish to hedge against commodity price risks. The manufacturer may, for example, buy raw materials (e.g., steel and brass) with which it builds the products (e.g., cars) it sells. The manufacturer may extract from its business plan the amount of each raw material needed in a given month or quarter. Since those prices, however, may fluctuate, the manufacturer may wish to hedge against the commodity (raw material) price risk. Commodities price risk management may also apply, for example, when buying or selling futures contracts; that is, contracts to buy specific quantities of a good at a specific price for future delivery at a specific time and place.

Businesses may also wish to split risks into their component parts. For example, if brass consisted of 60% copper and 40% zinc, then the price of brass could fluctuate with either the price of copper or the price of zinc. Thus, a car manufacturer may wish to independently hedge against the commodity pricing risks of brass, copper, or zinc. Similarly, the price of a mutual fund may depend on the price of its component stocks. Thus, a broker may wish to split mutual fund risks into manageable and tradable entities.

Moreover, different types of risk may overlap. For example, a car manufacturer in Germany who purchases brass from a supplier in the United States may wish to hedge against both the fluctuating price of brass (commodities price risk) and the fluctuating currency exchange rate (FX risk). Thus, the manufacturer may wish to segregate the commodities price risk and the FX risk to determine appropriate hedging instruments. Again, if the brass were composed of 60% copper and 40% zinc, the manufacturer may wish to further segregate the risks to hedge against each component risk.

A business may also wish to manage the life cycles of risks, for example the cycle of transforming raw materials into income. This cycle may begin, for example, with a plan to buy raw materials (e.g., brass and steel), transform the raw materials into products (e.g., cars), and sell the resulting products. Based on this business plan, the business may secure firm commitments from sellers to provide the raw materials. As the raw materials arrive from the sellers and are paid for, the business's assets and liabilities vary accordingly. As the end products are sold, income is generated, offsetting the liabilities.

Available computer applications aid in the organization and management of a business entity's risk exposures, hedging instruments, and hedging relationships, and generate hedge accounting data, e.g., indicating to what extent the risk of the exposure or exposure group of the hedging relationship is offset by the hedging instrument(s) of the hedging relationship. However, such hedging systems do not provide for automatic grouping of exposures. Further, such risk management systems may have limited capacity and thus not be capable of storing many thousands of entries. In some situations, the central treasury department and/or parent company and the other departments (non-central treasury departments) and/or the subsidiaries do not share the same system. Instead, non-central treasury departments and/or subsidiaries keep track of their individual transactions via separate systems. For the central treasury department and/or the parent company to manage the exposures of the individual transactions and to determine the hedging instruments that must be acquired by using the hedging systems, the data regarding the individual transactions that is already entered into the separate systems of the non-central treasury departments and/or subsidiary companies must be manually entered into the hedging system of the central treasury department and/or parent company.

Hedging systems also provide for associating hedging instruments with an exposure or exposure group via a hedging relationship data object, but, in the past, have required manual entry of data to associate the hedging instruments with the exposure or exposure group.

Thus, a fully integrated solution capable of managing many thousands of entries throughout the product life cycle is required. As production cycles shorten, the need for integration becomes even more important and useful.

SUMMARY OF INVENTION

In embodiments of the present invention, an exposure management solution is provided which does at least one of the following: separates exposures into several risks, handles exposure positions and the like, calculates key risk figures, e.g., value at risk, manages risk life cycles, and/or transforms risk factors. Transforming risk factors may involve, e.g., transforming different qualities of a commodity, decomposing an alloy into its original metals, or decomposing a mutual fund into its individual stocks.

DETAILED DESCRIPTION

Embodiments of the present invention relate to an exposure management solution which may handle at least one of: handling risks other than foreign exchange risks, separating exposures into several risks, handling exposure positions or the like, calculating key risk figures, managing risk life cycles, and/or transforming risk factors.

Embodiments of the present invention enable a customer to handle and hedge different kinds of risks, for example, foreign exchange (FX) risks and commodity price risks. The tool is flexible and may be adapted easily to existing and/or future customer systems, such as customer planning and production systems. In example embodiments, the tool provides seamless integration into existing hedge accounting solutions in compliance with, e.g., International Financial Reporting Standards (IFRS) 39 or Financial Accounting Standards Board (FASB) Statement No. 133. In an embodiment, the tool provides seamless integration into the analytical components of the Treasury and Risk Management, which makes both internal operational Risk Management and external Risk Reporting (e.g., according to IFRS 7) more efficient and accessible.

For purposes of illustration, the below example embodiments of the present invention largely concern commodity price risk and foreign exchange risk. However, the embodiments may be used for other purposes as would be evident to one of skill in the art. For example, embodiments of the present invention may involve all kinds of risks, such as financial risks including foreign exchange risk, interest rate risk, commodity price risk, stock price risk and counterparty risk.

Figure 1:
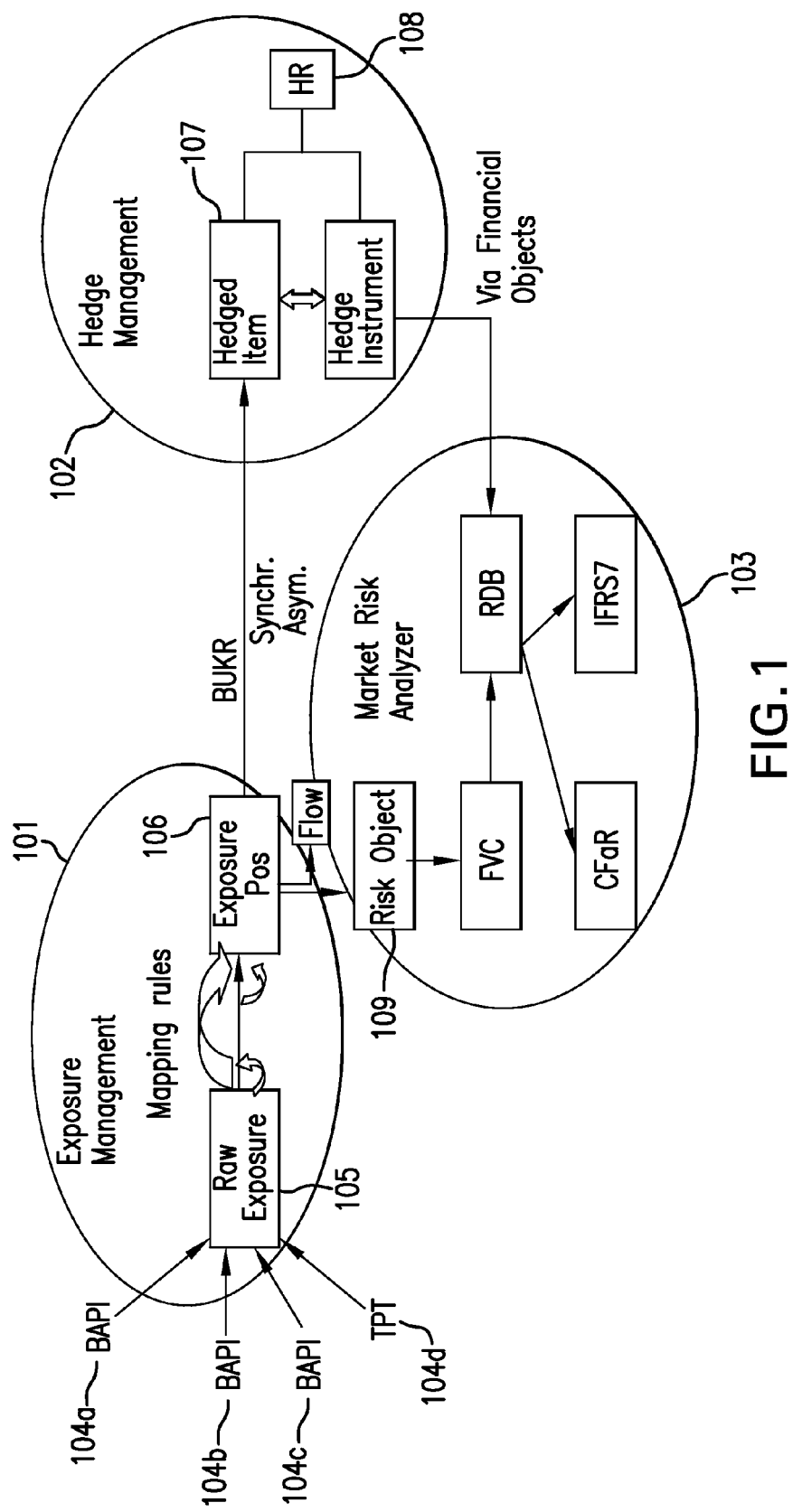
FIG. 1 is a block diagram that illustrates an example design of an exposure management system, according to an embodiment of the present invention.

FIG. 1 illustrates an example design of an exposure management system, according to an embodiment of the present invention. The exposure management 101 collects raw exposure data 105 from external sources 104 either manually or automatically. After being transformed into exposure positions 106, this data can then be transferred to, for example, hedge management 102, where exposure may be counteracted by, for example, a corresponding hedge relationship 108. In an embodiment, the data is transferred to, for example, a market risk analyzer 103, which in turn analyzes and prices the deal. In this example, exposure management 101 is a source for hedge management 102 as well as for market risk analyzer 103. In an embodiment, the tool is flexible and can be adapted to existing and/or future hedge management and risk analyzing solutions.

Whereas available systems provide only a 1-to-1 relationship between a raw exposure 105 and exposure position 106, example embodiments of the present invention can post a raw exposure 105 to many exposure positions 106, so that a single raw exposure 105 may influence multiple exposure positions 106. In this way, each exposure position 106 reflects exactly one risk, and each exposure position (risk) may be hedged or analyzed independently. For example, an exposure position 106 may be mapped directly to a hedged item 107 in hedge management 102, for which a hedge relationship 108 is then created. Thus, allowing complex mappings from raw exposure 105 to exposure position 106 enables 1-to-1 mapping of exposure positions 106 to hedged items 107. As another example, an exposure position 106 may be mapped directly (1:1) with a risk object 109 in market risk analyzer 103. This allows the market risk analyzer 103 to perform essential computations such as value-at-risk for each risk (exposure position).

Additionally, in example embodiments, the user can view which and how raw exposures 105 contribute to each exposure position 106. In an embodiment, the user can view the history of each exposure position 106, such as how the risk increased or decreased throughout a product's life cycle.

In example embodiments, one or more planning profiles are attached to an exposure position 106.

Figure 2:
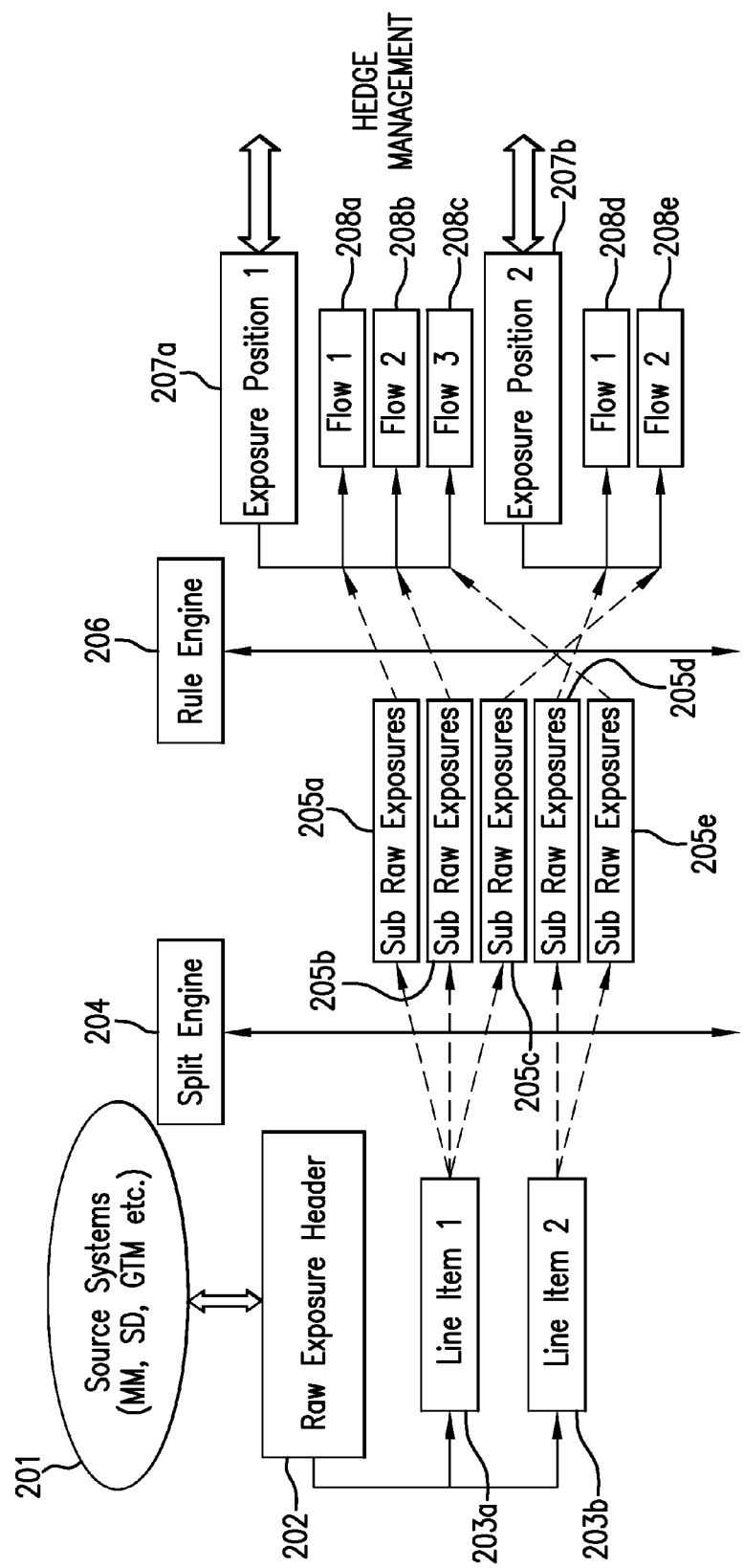
FIG. 2 is a block diagram that illustrates an example procedure performed for generation and management of exposure data objects, according to an embodiment of the present invention.

FIG. 2 illustrates an example procedure that may be performed for generation and management of exposure position objects, according to an embodiment of the present invention.

In example embodiments, the source systems 201 includes a sales and distribution (SD) module, a global trade management (GTM) system, and/or other industry-specific source solutions, and/or the user enters a replica of a sales order transaction in manual mode (MM). In an embodiment, the inputs are taken from a sales and distribution system.

In example embodiments, the raw exposure header 202 and one or more line items 203 store details about a sales or purchase order. For example, a single sale and/or purchase order is represented by a single raw exposure header 202. But, for example, since multiple items are transacted in a single sale or purchase order, each transaction component can be stored in a separate raw exposure line item (or "line item") 203a, 203b associated with the raw exposure header 202. In this way, each order need be entered only once.

In example embodiments, a raw exposure header 202 includes common fields such as external document number, document type (sales order (SO), purchase order (PO), global trade management type (GTM), etc.), company code, etc.

In example embodiments, raw exposure line items 203 include the actual items sold which should be analyzed for exposures. In an embodiment, each line item stores an item sold and can have at least one the following fields: (a) the original Material ID specified in, e.g., the sales or purchase order; (b) the Commodity ID as described below; (c) commodity-related fields such as quantity, unit of measure, etc.; (d) sales order fields such as amount, currency, etc.; (e) due date; and (f) profit center.

In example embodiments, the raw exposure header and/or line item fields are customizable.

As an example, a car manufacturer may purchase both brass and steel from the same supplier in a single purchase order. In this example, information about the purchase order such as external document number, SO document type, company code, etc. are stored in raw exposure header 202. Information about brass item (commodity) such as the material ID, the commodity ID, the quantity and unit of measure, the price, the due date, and/or the profit center are stored in line item 203a. Similar information about the steel commodity may be stored in line item 203b. Thus, the source system needs to transmit each order only once, and the system appropriately separates each order into its components.

In example embodiments, maintaining a Commodity ID separate from the Material ID may have at least one of the following: (1) the user may customize the system, e.g., implement a BADI, to create a commodity risk even for line items with no Commodity ID; (2) the Material ID may be different for the same commodity (for example, it may depend on the lot or delivery size); and (3) the customer may group commodities into a single category by using a Commodity ID for the category.

In example embodiments, the user maintains each commodity ID and component thereof in a Commodity Master Table, even if a commodity or component is not traded in the exchange. For example, if the commodity is brass wire, the customer may maintain not only brass wire as a commodity but also maintain the component percentages—e.g., 60% copper and 40% zinc. Each component (e.g., copper and zinc) may also be maintained as a commodity in the Commodity Master Table. In an embodiment, the tool features a default Business Add-Ins (BADI) implementation with a simple screen to perform this maintenance. However, in an embodiment, a BADI is not required; the customer may also modify splits at will, dynamically, and/or as matters progress.

In an embodiment, the customer maintains a commodity group as a commodity. For example, a customer may purchase both brass wire and steel wire as raw materials. In this example, the user may maintain a "wire" commodity group that includes both brass wire and steel wire. The user then allocates risk based on, for example, the ratio of brass wire to steel wire that the customer purchases.

In example embodiments, the split engine 204 generates sub raw exposures (or "sub exposures") 205 from the line items 203 based on user customizations. For example, the user specifies how each line item 203a, 203b is decomposed into its various components. The user can also, for example, assign percentage compositions where appropriate.

In an embodiment, the conversion of line item 203a to corresponding sub raw exposure(s) 205a-e depends on the setting done at the exposure activity type maintenance. For example, in the available SAP ERP® system, this may be executed at the IMG (Implementation Guide for R/3 Customizing) level.

In example embodiments, with respect to FX risks, if the currency of a line item 203 is different from the currency of the company code (target currency), then the split engine 204 automatically generates a foreign exchange sub raw exposure 205.

As an example, a car manufacturer in Germany purchases brass from a supplier in the United States. In this example, information about the brass item, including its price in USD, may be stored in line item 203a. Recognizing that the currency (USD) of the line item 203a is different from the target currency (E), the split engine 204 automatically generates FX sub raw exposure 205a.

In example embodiments, with respect to commodity risks, line item 203 includes a commodity ID. The commodity ID can be populated by, for example, line item population from the source system 201 via BAPI® (Business Application Programming Interface) (see also FIG. 1, 103a-c) and/or also manual entry by the user. In example embodiments, population of the commodity ID field enables system handling of commodity risks for that line item; if, for example, the commodity ID is not specified, then the system does not consider commodity risk.

In example embodiments, if the Commodity ID contains a valid ID (maintained in the Treasury) but no split is maintained, then the split engine 204 creates one sub raw exposure 205 at 100% for that commodity ID. In an embodiment, if the user maintains a split percentage, then the split engine 204 creates one or more sub raw exposures 205, each with a quantity corresponding to its percentage. In example embodiments, sub raw exposure creation depends on the exposure activity type settings.

Returning to the car manufacturer example, suppose the user maintained brass, copper, and zinc in the Commodity Master Table, wherein brass was specified to comprise 60% copper and 40% zinc. In an embodiment, if line item 203a stored information about brass purchased from a supplier, and if the commodity ID field contained the valid ID for brass, the split engine 204 automatically generates commodity sub raw exposure 205b (representing the commodity risk for copper) and there allocate 60% of the quantity specified in line item 203a (brass). Similarly, the split engine 204 may automatically generate commodity sub raw exposure 205c (representing the commodity risk for zinc) and there allocate 40% of the quantity specified in line item 203a (brass).

In example embodiments, the user need not maintain a split equaling 100%. For example, if the commodity iron includes 85% pure Fe and 15% dust/waste, the user may decide to maintain 85% pure Fe only. The split engine 204 uses this percentage to create sub raw exposures 205 for iron.

In example embodiments, the split engine is called for all line items, regardless of whether the commodity ID is set. In manual mode, the split engine 204 is invoked when a line item 203 is created. In BAPI®, for example, the split engine 204 may be invoked when the "create" is called.

In example embodiments, each sub raw exposure 205 has at least one of the following fields: (a) the risk type (e.g., commodity or FX risk) represented by the sub exposure; (b) the quantity; and (c) the percentage specified in the split customization. This allows the sub exposure quantity to be recalculated if the user later changes the split percentage for a particular exposure.

In example embodiments, when any line item data (except quantity) is modified, the system always refers to the split settings. Thus, any change in the split settings will apply to sub raw exposure commodity derivations if the underlying raw exposure is subsequently modified.

In example embodiments, rule engine 206 creates exposure positions 207 from sub raw exposures 205 based on aggregation and mapping settings defined by the user. In this way, as described earlier, each raw exposure 202 (see also FIG. 1, 105) is mapped to one or more exposure positions 207 (see also FIG. 1, 106) as needed. Thus, the user can individually hedge or analyze specific risks, whether direct (e.g., commodities risks) or indirect (e.g., FX risks).

In example embodiments, a mapping from a sub raw exposure 205 to an exposure position 207 are reflected as a flow 208. Thus, at any time, an exposure position 207 represents total exposure which can be traced to one or more flows 208. In this way, a user may view the contributors to and life cycle of specific risks (exposure positions) throughout a product or risk life cycle.

In example embodiments, an exposure position 207 is analogous to a security position pre-existing in Treasury.

In example embodiments, apart from reflecting the aggregated value, exposure positions 207 also reflect the positions that comprise the total position value.

In example embodiments, a position does not store anything, but instead has the characteristics which constitute the position. The aggregated value is not stored at the position level.

In example embodiments, the "Exposure Position Type" screen allows the user to specify whether and how the rule engine 206 aggregates sub raw exposures 205 into exposure positions 207 through rule-mapping.

In example embodiments, if aggregation is not chosen, then an exposure position 207 is created for each sub raw exposure 205.

In example embodiments, if aggregation is chosen, then the rule engine 206 aggregates the sub raw exposures 205 into exposure positions 206 based on fixed fields and rule-mapping conditions. If a specified exposure position 207 does not yet exist, then the rule engine 206 creates it. If the specified exposure position 207 does exist, then the rule engine 206 updates it.

In example embodiments, aggregation is based on one or more of the following fixed fields (which, in example embodiments, the user may not modify): (a) period; (b) currency (this field is fixed only if the Sub Raw Exposure Type is a foreign exchange risk); and/or (c) commodity ID (this field is fixed only if the Sub Raw Exposure Type is commodity price risk).

In example embodiments, the user creates and maintains other aggregation conditions based on any free attribute.

For example, a user specifies a rule for period quarter 1 (Q1), currency USD, commodity copper, and quantity <1000 tonnes. The user then assigns the rule to an exposure position. In that case, the exposure position includes the aggregation of all sub raw exposures of copper commodity deliveries in Q1 with USD currency and quantity <1000 tonnes.

In an embodiment, the rule is set up and assigned to different exposure position types. Thus, different positions may be created.

Figure 3:
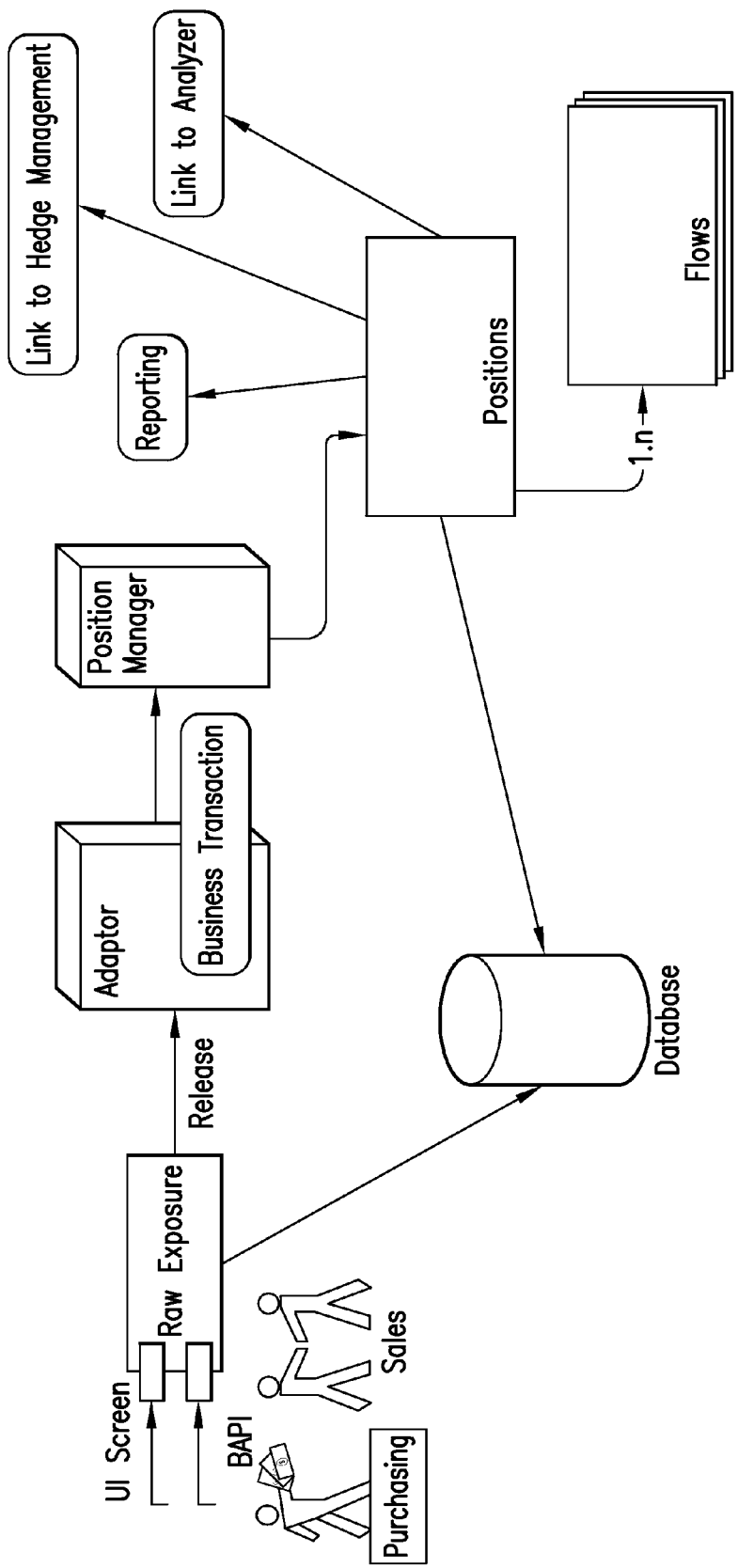
FIG. 3 is a block diagram that illustrates an example procedure performed for generation and management of exposure data objects, according to an embodiment of the present invention.
Figure 4A:
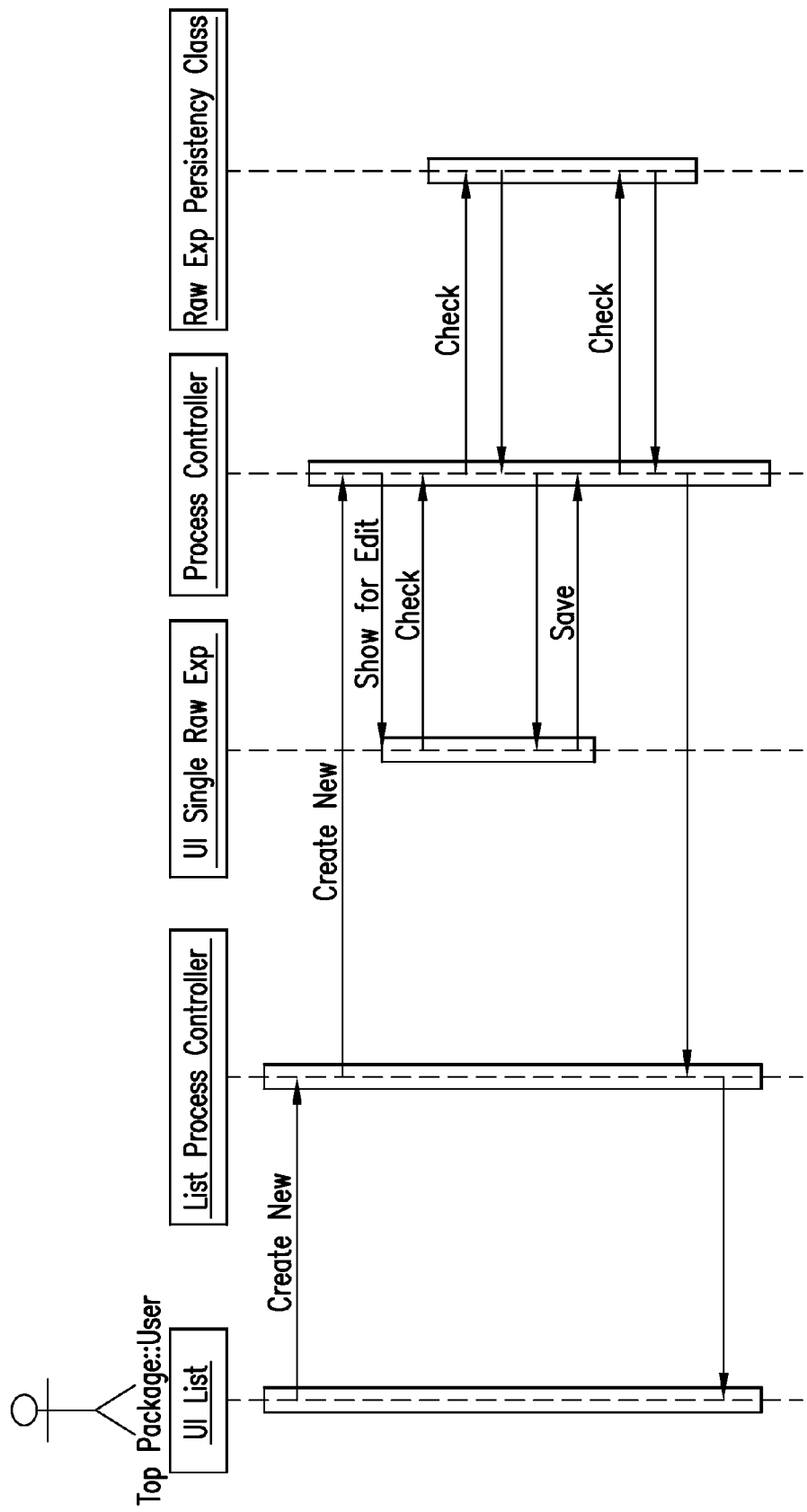
FIGS. 4A and 4B are sequence diagrams illustrating an example procedure performed for generation and management of exposure data objects, according to an embodiment of the present invention.
Figure 4B:
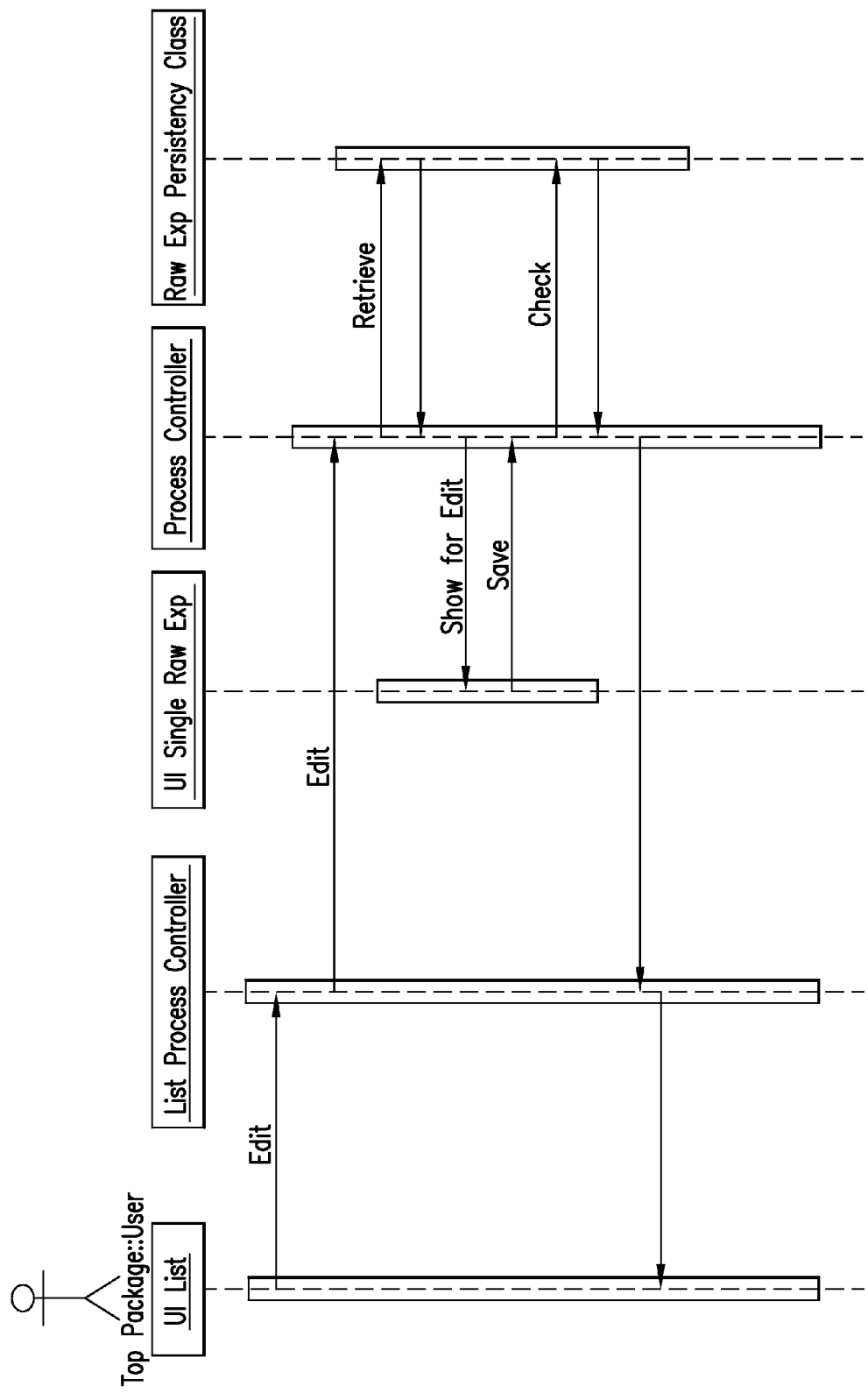

In example embodiments, as shown in FIG. 3, the customer initiates a release process. The release uses the release workflow process. For example, the customer verifies the raw exposures 202 and manually releases the transaction. As another example, the user saves the raw exposure, opens it in "Display" mode, and presses "Initiate Release" to start the release workflow. The release occurs at the raw exposure 202, not sub raw exposure 205, level.

In example embodiments, the release workflow process operates according to its settings. If set for direct processing, the rule engine 206 uses the mapping settings to create exposure positions 207 from sub raw exposures 205. If set for workflow process, the system creates workflow items, which another user must authorize and/or release. If set for bypass, the customer may bypass the release workflow process.

Subsequent processing and analysis of exposure positions 207 is discussed in various embodiments throughout this application. Those skilled in the art will easily recognize other uses for and applications of the exposure position data object.

Likewise, those skilled in the art can appreciate from the foregoing description that the present invention can be implemented in a variety of forms. For example, the above embodiments may be used in various combinations with and without each other. Therefore, while the embodiments of this invention have been described in connection with particular examples thereof, the above embodiments are for illustration purposes only and are not meant to limit the scope of the present invention. The true scope of the embodiments of the invention should not be so limited since other modifications will become apparent to the skilled practitioner upon a study of the present application.

What is claimed is:

1. A method for risk exposure management that allows a sales record to influence at least one risk exposure, the method comprising:

identifying an item transacted from a line item in a sales order, the line item including an identifier of the item transacted, a quantity unit of the item transacted, and a payment term of the item transacted, wherein the item transacted includes a component;

comparing, using a processing device, the identifier of the item transacted to those in a lookup table;

identifying from the lookup table as a result of the comparing, the component of a transacted item and an allocation quantity of the identified component, wherein the allocation quantity represents an amount of the identified component included in the transacted item;

creating a sub raw exposure record for the identified component, the sub raw exposure record including the quantity unit of the item transacted in the line item and the identified allocation quantity of the identified component from the lookup table; and mapping, using the processing device, data in the created sub raw exposure record to an exposure position for the identified component, the exposure position representing an aggregated exposure for the identified component calculated in part from the quantity unit and the identified allocation quantity in the sub raw exposure record.

2. The method of claim 1, further comprising receiving the sales record through at least one of a manual entry, an automatic entry, and a sales system.

3. The method of claim 2, wherein the payment term of the item transacted include a currency identifier and a price term.

4. The method of claim 3, further comprising creating a currency exposure record based on a currency specified in the currency identifier, the currency exposure record including the currency identifier, the price term, and the quantity unit of the item transacted.

5. The method of claim 4, further comprising mapping data in the created currency exposure record to an exposure position associated with the currency specified in the currency identifier, the currency exposure position representing an aggregated exposure to the currency specified in the currency identifier calculated in part from the price term and the quantity unit of the item transacted.

6. The method of claim 5, wherein the price term represents a price per quantity unit and the aggregated exposure to the currency is calculated in part from multiplying the price term and the quantity unit of the item transacted.

7. The method of claim 3, further comprising mapping the price term to an exposure position associated with a currency specified in the currency identifier to calculate an aggregated exposure to the currency specified in the currency identifier.

8. The method of claim 7, wherein the aggregated exposure to the currency specified in the currency identifier is calculated in part from the mapped price term.

9. The method of claim 1, wherein a value in the lookup table and the mapping of data to the exposure position correspond to at least one criteria of a planning profile.

10. The method of claim 9, wherein the planning profile is associated with a hedging requirement.

11. The method of claim 1, further comprising generating a flow data object reflecting a mapping relation between the sales order and the exposure position.

12. The method of claim 1, further comprising hedging the exposure position at a hedging system.

13. The method of claim 12, wherein hedging the exposure position includes:
  automatically generating an electronic purchase order (P.O.) requesting a purchase of a hedging instrument, wherein the P.O. includes a unique identification of the exposure position;
  transmitting the P.O. to a marketplace;
  receiving from the marketplace a responsive transaction notification message including a transaction detail and a copy of the unique identification;
  automatically generating a hedging instrument data object based on the transaction detail; and
  based on the copy of the unique identification, associating the hedging instrument data object with the exposure position.

14. The method of claim 1, further comprising analyzing the exposure position at a risk management system.

15. The method of claim 1, further comprising calculating a value at risk for the exposure position at a risk management system.

16. A non-transitory computer-readable storage medium with an executable program stored thereon, wherein the program, when executed, instructs a processor to perform steps comprising:
  identifying an item transacted from a line item in a sales order, the line item including an identifier of the item transacted, a quantity unit of the item transacted, and a payment term of the item transacted, wherein the item transacted includes a component;
  comparing the identifier of the item transacted to those in a lookup table;
  identifying from the lookup table as a result of the comparing, the component of a transacted item and an allocation quantity of the identified component, wherein the allocation quantity represents an amount of the identified component included in the transacted item;
  creating a sub raw exposure record for the identified component, the sub raw exposure record including the quantity unit of the item transacted in the line item and the identified allocation quantity of the identified component from the lookup table; and
  mapping data in the created sub raw exposure record to an exposure position for the identified component, the exposure position representing an aggregated exposure for the identified component calculated in part from the quantity unit and the identified allocation quantity in the sub raw exposure record.

17. A system for risk exposure management that allows a sales record to influence one or more risk exposures, the system comprising:
  an arrangement configured to identify an items transacted from a line item in a sales order, the line item including an identifier of the item transacted, a quantity unit of the item transacted, and a payment term of the item transacted, wherein the item transacted includes a component; and
  a processing device arrangement configured to:
    compare the identifier of the item transacted to those in a lookup table;
    identifying from the lookup table as a result of the comparing, the component of a transacted item and an allocation quantity of the identified component, wherein the allocation quantity represents an amount of the identified component included in the transacted item;
    create a sub raw exposure record for the identified component, the sub raw exposure record including the quantity unit of the item transacted in the line item and the identified allocation quantity of the identified component from the lookup table; and
    map data in the created sub raw exposure record to an exposure position for the identified component, the exposure position representing an aggregated exposure for the identified component calculated in part from the quantity unit and the identified allocation quantity in the sub raw exposure record.

* * * * *